April 6, 1965  W. T. HARRIS  3,176,788
TRANSMISSION OF VIBRATORY ENERGY
Filed July 14, 1960  2 Sheets-Sheet 1
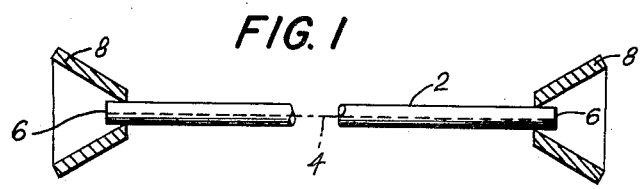
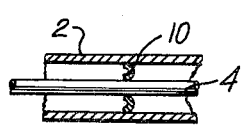
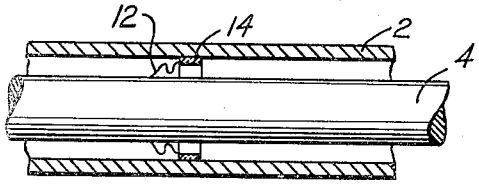
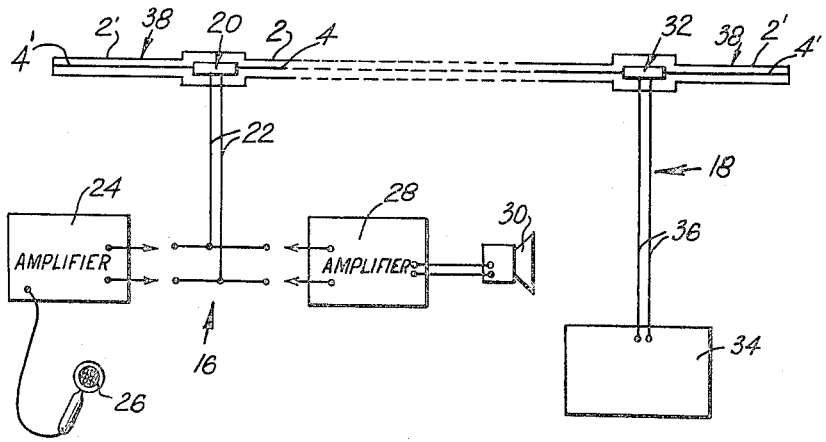
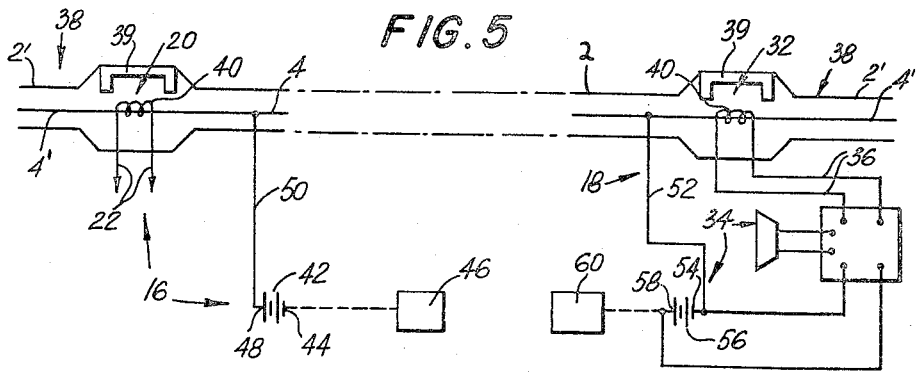
INVENTOR.
WILBUR T. HARRIS
BY
*James and Franklin*
ATTORNEYS

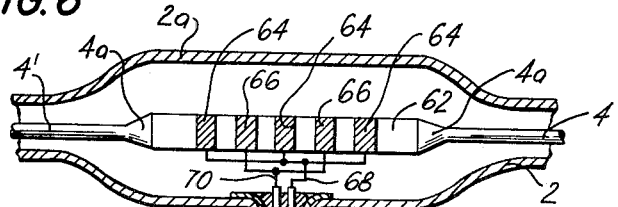
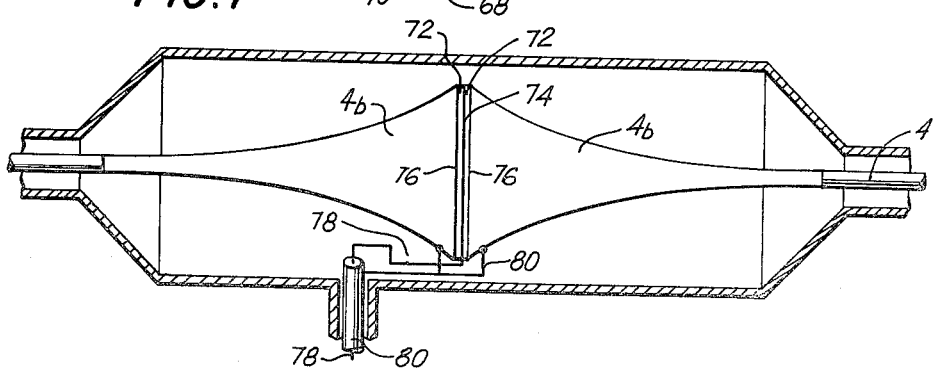
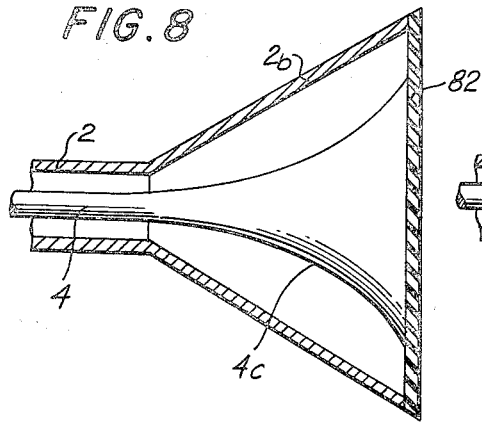
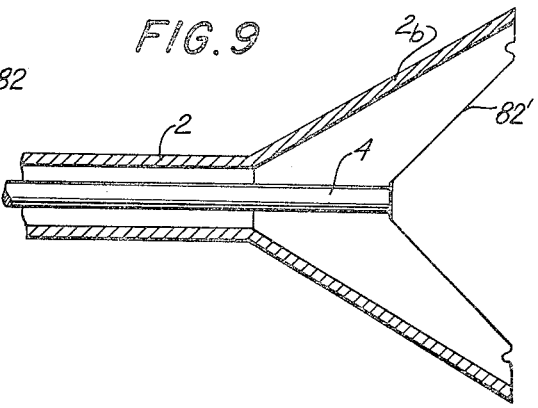
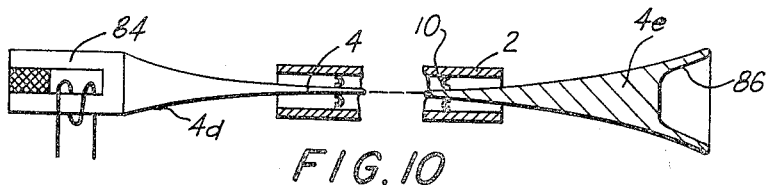
INVENTOR.
WILBUR T. HARRIS 3,176,788
TRANSMISSION OF VIBRATORY ENERGY
Wilbur T. Harris, Woodbury, Conn., assignor to The Harris Transducer Corporation, Woodbury, Conn., a corporation of Connecticut
Filed July 14, 1960, Ser. No. 42,929
4 Claims. (Cl. 181—29)

The present invention relates to systems and devices for the transmission of vibratory energy between remote points. The practice of the present invention is particularly advantageous in connection with the transmission through a body of water of communication in the form of vibrator energy within the range of frequencies between 100 c.p.s. and 600 k.c.p.s., but in its broader aspects it is not limited thereto.

There are many occasions where energy transmission, whether of intelligence or power, through water between remote points is desirable. Trans-oceanic communications represent but one specific and relatively conventional instance. Conventional transmission of this type is electrical in nature, and is relatively satisfactory for communications between fixed land points, although it is, because of its electrical nature, subject to disruption from outside sources through electromagnetic and capacitive interaction.

The transmission system of the present invention is suitable for the transmission of communications or power between remote points, including fixed shore points separated by a body of water, but has the advantage that it is not subject to electrical interaction with its surroundings at any point along the length of the communications line.

There are many instances where communication with a point beneath the surface of the sea is desired. A fixed shore station might wish to communicate with all vessels at a given area of the ocean, or might wish to directly control and actuate sonar submarine detecting apparatus located many miles from shore. For this purpose conventional electrical transmission through electrically conductive cables is not satisfactory for various reasons, including the problems of transmitting adequate amounts of electrical power over long distances, the electrical losses associated therewith, and the short operating life and lack of reliability of the electrical equipment which would have to be more or less permanently located at the remote underwater station.

Transmission of vibratory energy directly through the water for appreciable distances is not feasible. The major factor limiting the distance of such direct energy transmission is not attenuation, but instead is spreading loss and effects due to reflections from the sea bottom. For example, for vibratory energy at a frequency of 700 cycles per second, the signal diminuition due to absorption is approximately 12 db for each 1000 kiloyards. The loss due to spreading in the first 1000 kiloyards, however, is on the order of 108 db. Since attenuation varies as the square of the frequency, direct transmission through water on distances on the order of 1000 kiloyards or over would require the use of a very low frequency, thus severely restricting band width. Moreover, the speed of sound through water is rather low—approximately one mile per second—so that a 1000-mile two-way transmission would require approximately 35 minutes.

The present invention provides means for the transmission of vibratory energy between two widely spaced points, one or both of which may be located beneath the surface of the sea, and whether separated by land, sea or air, with a high degree of security and reliability, at reasonable speeds of transmission, with acceptable degrees of attentuation, with the use of simple and reliable transducing means, and at frequencies which will permit appreciable band widths.

The present invention operates on the principle of direct mechanical transmission of vibratory energy along elongated wirelike bodies formed of hard materials, such as metal, glass or ceramics. Such materials are superior to water in their vibration-transmitting characteristics, both as to speed (from three to six times that of water) and attenuation (approximately 1 db per hundred miles at lower audio frequencies), and they have exceptionally high power handling capabilities (estimated $10^5$ watts per square centimeter of body cross-section). This latter characteristic is particularly significant where communication with an under-water station is involved; the amounts of power which can be directly transmitted may be sufficiently high to eliminate the need for any electrical equipment at the underwater end of the transmission line and still provide for adequate energy propagation directly into the surrounding water medium at that point. Indeed, the power handling capabilities of the systems here disclosed indicates that they are capable of transmission of energy in true power quantities, as distinguished from the transmission of intelligence signals, over long distances with much lower losses than is presently associated with conventional electrical power transmission.

The actual transmitting body may be constituted by an elongated sheet, strip or wire of appropriately hard material. Mechanical vibrations within the normal cross sectional confines of the body are set up at one end of the line. These vibrations may either be torsional or longitudinal, and may be produced in the line by any suitable vibratory apparatus mechanically connected thereto. Thus means may be provided for causing the body to vibrate directly in accordance with the vibrations of sound impinging upon one end thereof without transducing those vibrations into another form of energy, as by means of a mechanically coupled diaphragm or a cavity structure. Alternatively, an electrostrictive transducer of the magnetic or electrostatic type could produce vibrations in the body at a predetermined carrier frequency, which vibrations are modulated in conventional fashion in accordance with the desired intelligence to be transmitted. If only power transmission is involved, the transducer could set up vibrations in the line at an appropriately high frequency. For all types of transmission a carrier frequency of 200 kc. is entirely appropriate, and frequencies in the megacycle range are possible.

These vibrations are mechanically transmitted by the body along its length and may be usefully detected at any point therealong.

The vibration-transmitting bodies will have cross sectional areas relatively small compared with the wave length of the vibrations of the frequencies to be transmitted, in order to achieve best efficiency. Their mechanical impedances will often be different from the mechanical impedances of the transducers located at the opposite ends of the lines. An abrupt mis-match between impedances would lead to undesirable vibration reflections. This problem may readily be avoided, in a manner peculiar to the nature of the vibration-transmitting bodies involved, by providing taperingly radially enlarged portions at the ends of those bodies to which the transducers are operatively connected.

One problem involved in energy transmission of the type here under discussion is the leaking of energy from the elongated body to the surrounding medium. This problem is particularly acute if the elongated body were to be directly surrounded by water, although the power handling capabilities of the elongated bodies are such that for middle distances leakage into the surrounding water medium might well be tolerated, particularly where the elongated body was in the form of a thin wire carrying vibrations within the sonic range of frequencies. However, for most efficient operation the elongated body is mounted within and is spaced from a sheath longitudinally coextensive therewith. It may be supported within the sheath by a plurality of supporting members relatively widely longitudinally spaced along the body and making an essentially point contact therewith. The space between the body and sheath may be evacuated for most efficient results, but even when air-filled will function effectively to reduce and minimize transmission losses.

Systems of the type here disclosed can provide for transmission through earth, air or water. In their simplest form they can be used as "speaking" tubes, transmitting sound at a higher speed and with much greater end intensities than in the case of direct transmission through water. In somewhat more complex forms the use of electrically energized transducers permits refined types of communication. The elongated bodies themselves can be used to transmit electrical energy to such transducers, thereby enabling them to have substantially unlimited operating lives.

To the accomplishment of the above, and to such other objects as may hereinafter appear, the present invention relates to the construction of energy transmission systems and devices to be used in conjunction therewith, as defined in the appended claims, and as described in this specification, taken together with the accompanying drawings, in which:

FIG. 1 is a schematic view of a simplified embodiment of the present invention;

FIGS. 2 and 3 are cross sectional views, showing alternative ways for supporting the elongated vibration-transmitting body inside a sheath;

FIG. 4 is a schematic view illustrating the system for communication between a shore station and an underwater station;

FIG. 5 is a schematic view of another system for communicating between shore and an underwater station, in which the vibration-transmitting body is also used to transmit electrical energy to the underwater station;

FIG. 6 is a cross sectional view indicating one manner in which an electrostrictive transducer can be incorporated into the system;

FIG. 7 is a cross sectional view of an alternative construction to that of FIG. 6.

FIG. 8 is a cross sectional view illustrating an acousto-mechanical termination structure for the transmission line suitable for underwater use;

FIG. 9 is a view similar to FIG. 8 but showing a termination suitable for non-underwater use; and FIG. 10 is a schematic view of an alternative shore-underwater transmission system.

FIG. 1 is a rudimentary and semi-schematic representation of the basic elements of the transmission system of the present invention. It discloses an elongated sheath member 2 within which is mounted an elongated vibration-transmitting body 4 the ends of which are operatively mechanically connected to vibratable diaphragms 6 which close off the ends of the sheath 2 and which may be considered as transducers, transforming vibrations which impinge upon them into longitudinal vibrations in the body 4, or which transform longitudinal vibrations in the body 4 into vibrations propagated into the medium surrounding the diaphragm 6. The diaphragm ends of the system are shown surrounded by conical horns 8 for conventional acoustical reasons.

The longitudinally extending body 4 may be formed of any solid material capable of efficiently transmitting vibrations from one end thereof to the other. Hard metals and glasses are eminently suitable. It is preferred that the material used have the capability of transmitting vibrations at a velocity at least three times that of water and that it have high mechanical Q's.

Typical preferred materials are the harder aluminum alloys (such as those commercially designated 6061-T6 and 2024-T4), spring steel and beryllium. The body 4 may be in the form of an elongated strip, but a round wire shape is preferred, since that is readily obtainable and easy to handle. The cross sectional area of the body 4 should be small relative to the wave length through the body of vibrations at the frequencies to be transmitted. For example, for vibration frequencies of 200 kc., involving a wave length in the body 4 of approximately one inch, the diameter of the body 4 may be approximately .1 inch. This is desired both for purposes of improving transmission efficiency and for facilitating the coiling or rolling of the body 4, a practical necessity when transmission lines of appreciable length (e.g. 100 miles) are involved.

The sheath 2 may be formed of any suitable material capable of holding its shape, so that it will not collapse and touch the body 4 therewithin. Where the transmission line is to be laid on the bottom of the sea, it should be sufficiently strong to withstand the pressures of the water thereabove. It might be formed of metal or reinforced fiber or rubber. With a body 4 having a diameter of .1 inch, the outside diameter of the sheath 2 may be ¼ inch, by way of example.

The body 4 is supported within the sheath 2 so as to be spaced from the latter and essentially mechanically disconnected therefrom, in order to minimize vibratory energy leakage from the body 4. FIGS. 2 and 3 illustrate typical ways in which this can be accomplished. In FIG. 2 eyelets 10 are received over the body 4 and are spaced along the length thereof, the eyelets 10 also engaging the interior of the sheath 2. In FIG. 3 a thin bellows type of eyelet 12 engages the body 4 at one end and has at its other end a ceramic vitreous enamel insulating lip 14 which engages the interior of the sheath 2. This embodiment is particularly useful when electrical insulation of the body 4 from the sheath 2 is desired. The body mounting elements 10 and 12, or equivalent structure, should engage the body 4 over as limited an area as possible, and preferably substantially along a line or a series of points, and the number of such elements 10 or 12 which are used should be as few as possible consistent with reliably maintaining the body 4 out of contact with the sheath 2, all to the end that vibration energy leakage from the body 4 is minimized. The longitudinal spacing between the elements 10 or 12 should preferably be random in nature in order to minimize or suppress vibration reflections at the support points.

Construction of transmission lines of appreciable length could be accomplished as follows: An individual body 4 of convenient relatively short length could be assembled with its supporting eyelets 10 or 12. Those eyelets could be brazed to the body 4 at desired points if the body 4 were provided with suitable cladding. A sheath section 2 of corresponding length could then be slid over the body 4 with its attached eyelets 10 or 12. A second body length 4 could then, either before or after the eyelets 10 or 12 are secured thereto, be butt welded to the first body length 4, a second sheath section 2 could be slide thereover and butt welded to the first sheath section 2, and so on, the assembled coaxial transmission line being reeled up as it is completed.

Where the ends of the sheath 2 are sealed off, as by the diaphragms 6, the space between the body 4 and the interior of the sheath 2 could be evacuated in order to minimize leakage losses. The presence of air in that space permits a minimal and acceptable degree of leakage. The presence in that space of vibration-absorbing material or material which will effectively transmit vibrations to the sheath 2 should be avoided, except for the special purposes hereinafter set forth in connection with the terminating stubs 38.

In the simplified embodiment of FIG. 1 vibrations in the medium surrounding the right hand diaphragm 6 and horn 8 will enter the horn 8 and cause the diaphragm 6 to vibrate back and forth. Since it is directly mechanically connected to the right hand end of the body 4, longitudinal vibrations will be set up in the body 4 and will be efficiently and effectively transmitted along the length thereof at a high rate of speed to the left hand end thereof, where the left hand diaphragm 6 will be caused to vibrate and thus to propagate into the medium surrounding itself and the left hand horn 8 the same vibrations which impinged upon the right hand diaphragm 6. Thus a device of this character will function as a "speaking tube" operating over vast distances without permitting the spreading, and consequent loss, of the detected vibration. The nature of the medium surrounding the sheath 2 would not affect the vibration transmission, whether it were air, water or earth.

FIG. 4 illustrates schematically a somewhat more sophisticated system suitable for use, for example, for sonar communication between a shore station generally designated 16 and an underwater station generally designated 18 and located a substantial distance, perhaps 1000 miles, from the shore station 16. As in the embodiment of FIG. 1, a transmission line comprising an elongated vibration-transmitting body 4 surrounded by and spaced from a protecting sheath 2 extends between the stations 16 and 18. An electromechanical transducer 20 is connected to the transmission line at the shore station 16, and is adapted to be energized by leads 22 connected selectively to a transmitting amplifier 24 actuated by a microphone 26 or a receiving amplifier 28 which energizes a loudspeaker 30. An electromechanical transducer 32 is connected to the other end of the transmission line at the station 18, and it is adapted to actuate underwater sonar sending and receiving equipment 34 via leads 36. Terminating stubs generally designated 38 extend from each of the transducers 20 and 32 in a direction opposite to that of the transmission line proper, those stubs comprising elongated body sections 4' surrounded by sheath sections 2', the space between the two being filled with a vibration-absorbing material such as rubber, wax, or polyisobutylene in mechanical engagement with the body sections 4'. The lengths of the terminating stubs 38 may be relatively short.

The system of FIG. 4 may be designed to operate on a carrier frequency of, for example 200 kc., modulated by an appropriate signal such as that produced by the sound spoken into the microphone 26. These modulated vibrations will be imparted to the elongated body 4 in a longitudinal sense by the transducer 20 and will be transmitted rapidly, accurately and efficiently by the body 4 to the transducer 32 at the station 18, where they will be detected and transformed by the receiving equipment 34 and transmitted to the medium surrounding that equipment (e.g., the sea) in conventional manner. Vibrations received by the equipment 34, such as those which might be transmitted from sonar equipment on a vessel in the vicinity thereof, would be transmitted back to the station 16, where they could be heard through the loudspeaker 30.

The embodiment of FIG. 5 is essentially similar to that of FIG. 4, and similar reference numerals are applied thereto, except that the transducers 20 and 32 are specifically schematically indicated as of the magnetrostrictive type, comprising a permanent magnet means 39 and a winding 40 in the field thereof. The embodiment of FIG. 4 further indicates an application of a very effective capability of the system of the present invention, to wit, the use of the body 4 for the transmission of electrical energy as well as mechanical vibratory energy. This is particularly important when the system is to be used in conjunction with a remotely located and relatively inaccessible station, such as the underwater station 18, where electrically energized equipment must be located. It is not too difficult to seal equipment of that type to prevent the entry of seawater, but the batteries which energize that equipment do not have a perpetual life. As disclosed in FIG. 5, the shore station 16 is provided with a D.C. source 42, one terminal 44 of which is electrically connected to a ground electrode 46 located in the sea and the other terminal 48 of which is connected by lead 50 to the body 4. That body may be formed of electrically conductive material, or may have an electrically conductive coating extending to the underwater station 18. There the lead 52 electrically connects the body 4 to the terminal 54 of the battery 56 which energizes the equipment 34, the other terminal 58 of the battery being connected to a ground electrode 60 located in the sea. Thus a D.C. trickle charge is transmitted along the body 4 to keep the battery 56 continuously at proper strength. It will be realized that D.C. power can be transmitted over the long distances which may be involved with significantly less loss than A.C. power.

FIG. 6 illustrates one type of electromechanical transducer which may be employed, and shows a typical way in which it can be connected to the line 4. In FIG. 6 the transducer comprises a piezolectric rod 62 having spaced and oppositely electrically polarized conductive strips 64 and 66 applied thereto, the spacing between the strips preferably being less than one-half the wave length of the highest frequency to be transmitted. The conductive strips 64 and 66 are adapted to be energized via leads at 68 and 70 respectively, which extend out through a sealed portion of the sheath 2.

The cross sectional size of the transducer of FIG. 6 will usually be greater than the cross sectional size of the vibration-transmitting body 4 and the mechanical impedances of these two elements will be different. In order to provide for proper impedance match, thereby to make for most efficient energy transfer and to minimize vibration reflection, those portions of the body 4 and the terminating stub portion 4' are taperingly radially enlarged, at 4a, thereby to define an impedance transforming coupling. The area 2a of the sheath 2 which surrounds the transducer may also be accommodatingly radially enlarged, as indicated.

FIG. 7 illustrates the manner in which an electrostrictive transducer may be used in accordance with the present invention, that transducer comprising a pair of disks 72 of appropriate material, each of a thickness small compared to the wavelengths of the highest frequency to be transmitted, with a central electrode 74 and outer electrodes 76 which are adapted to be oppositely electrically polarized via leads 78 and 80 respectively, the portions of the body 4 mechanically connected thereto being taperingly radially enlarged at 4b in order to define an impedance transforming coupling.

FIG. 8 discloses a non-electrical transmission line termination suitable for use in underwater locations. The sheath 2 is taperingly radially enlarged, at 2b, and its outer end is closed and sealed by a vibratable rubber diaphragm 82. The end of the vibration-transmitting body 4, which is taperingly enlarged at 4c to define an appropriate impedance transforming coupling, is directly connected to the diaphragm 82.

FIG. 9 discloses a non-electric terminating structure similar to that of FIG. 8 but suitable for use when the surrounding medium is air. The diaphragm 82' which closes the enlarged end 2b of the sheath 2 may be made quite thin and, for that reason and because the surrounding medium has considerably less impedance than water, the vibration-transmitting body 4 may be directly connected thereto without any specially shaped impedance transforming coupling. The non-electric terminations of FIGS. 8 and 9 may be employed where transmission over comparatively short distances is involved or where the amounts of energy transmitted are sufficiently great as not to require the use of auxiliary equipment at the end of the line.

FIG. 10 discloses semi-schematically a transmission line having at one end a magnetostrictive transducer 84 directly connected to the vibration-transmitting body 4 by means of an impedance transforming coupling structure 4d. The other end of the body 4 has a non-electric termination defined by a taperingly radially enlarged portion 4e the end of which is provided with an axially outwardly opening cavity 86 which defines an integrally formed "megaphone" or "horn" structure which transforms vibrations in the medium which surrounds it into longitudinal vibrations in the body 4 or vice versa.

In the embodiments here specifically disclosed the vibrations transmitted by the body 4 are all longitudinal in nature. The disclosure is of this character primarily because of the ready availability of transducers capable of imparting this mode of vibration to the elongated bodies 4, and also because the body 4 transmits longitudinal vibrations more rapidly than torsional vibrations. However, the use of torsional vibrations is entirely within the scope of the instant invention.

Transmission of intelligence or even of energy in power quantities by means of the system here disclosed is in many respects superior to conventional types of electrical transmission. Electrical transmission is characterized by capacitive and inductive coupling to its surroundings and by large resistive losses, requiring the frequent use of repeater stations. It is difficult to obtain Q's as high as 100 in electrical resonators capable of use in ordinary power and communications circuits. By way of contrast, the system of the present invention functions electrically independently of its surroundings, has extremely low resistance or attenuation losses, and mechanical resonators having Q's as high as 10,000 are easy to produce.

Theoretical calculations indicate that an aluminum wire having a diameter of ⅛ inch could transmit 3.5 kilowatts of power when used in accordance with the present invention, and if spring steel wire were used 10 kilowatts of power could be handled. This compares most favorably with the capabilities of electrical power-transmission systems, and the system of the present invention involves considerably less power loss than conventional electrical systems. Moreover, the transmission of mechanical vibrations permits great simplification of the power generating equipment. Thus thermocouples could be used to convert heat to electrical current, that current could energize semi-conductor oscillators which would in turn energize the transducers actuating the transmission systems of the present invention, thus leading to the generation of power and transmission thereof to remote places without any sensibly moving parts and without wear, high voltage, susceptibility to lightning, large supporting towers, heavy electrical insulators, and the like.

Moreover, a system of the present invention can be used most effectively for the transmitting of intelligence between remote stations, and particularly to and from stations located beneath the surface of the sea at great distances from shore.

While but a limited number of embodiments of the present invention have been here disclosed, it will be appreciated that the details thereof are in the main purely exemplary, and that many variations may be made therein, all within the spirit of the invention as defined in the following claims.

I claim:
1. An energy transmission system comprising an elongated sheath, an elongated wire-like hard body, a portion of which longitudinally coextensive therewith has appreciable electrical conductivity, spaced from and extending along the inside of said sheath and essentially mechanically disconnected therefrom, means operatively connected to a first point on said body for causing mechanical vibration of said body within the normal cross-sectional confines thereof, and means operatively connected to said body at a second point remote from said first point for detecting mechanical vibrations thereof, at least one of said means being electrical in nature and electrically connected to said body, and additional means for transmitting electrical energy via said body to said one of said means from a point on said body remote from said one of said means.

2. The system of claim 1, in which said vibrations caused by said first mentioned means are longitudinal of said body.

3. The system of claim 1, in which said body is supported within said sheath substantially solely by a plurality of essentially non-rigid members extending between said body and said sheath, randomly spaced from one another along the length of said body, and collectively engaging said body along a minimal and minor proportion of the total length of said body.

4. An energy transmission system comprising an elongated sheath, an elongated wire-like hard body spaced from and extending along the inside of said sheath and essentially mechanically disconnected therefrom, said sheath coaxially surrounding said body, means operatively connected to a first point on said body for causing mechanical vibration of said body within the normal cross-sectional confines thereof, and means operatively connected to said body at a second point remote from said first point for detecting mechanical vibrations thereof, said body being supported within said sheath substantially solely by a plurality of essentially non-rigid members extending between said body and said sheath, randomly spaced from one another along the length of said body, and engaging said body along a substantially point contact longitudinally of said body, the contact areas collectively constituting a minimal and minor proportion of the total length of said body.

References Cited by the Examiner

UNITED STATES PATENTS

| | | | |
|---|---|---|---|
| 444,464 | 1/91 | Shaver | 181—29 |
| 479,227 | 7/92 | Shaver | 181—29 |
| 1,678,116 | 7/28 | Harrison | 333—30 |
| 1,760,252 | 5/30 | Nicolson | 181—31 |
| 2,293,181 | 8/42 | Terman | 333—30 |
| 2,304,803 | 12/42 | Crook | 333—30 |
| 2,503,831 | 4/50 | Mason | 333—30 |
| 2,514,080 | 7/50 | Mason | 333—30 |
| 2,612,603 | 9/52 | Nicholson | 333—30 X |
| 2,727,214 | 12/55 | McSkimin | 333—30 |
| 2,815,490 | 12/57 | De Faymoreau | 333—30 |
| 2,853,145 | 9/58 | Martin | 333—30 X |
| 2,906,971 | 9/59 | Mason et al. | 333—30 X |
| 2,926,217 | 2/60 | Powell | 333—30 |
| 2,995,736 | 8/61 | Tellerman | 333—30 |
| 3,011,136 | 11/61 | Scarrott | 333—30 |

FOREIGN PATENTS

| | | |
|---|---|---|
| 711,667 | 6/31 | France. |
| 781,902 | 8/57 | Great Britain. |

OTHER REFERENCES

Rothbart: Proceedings of the I.R.E., vol. 47, No. 6, June 1959, pages 1153–1154.

LEO SMILOW, *Primary Examiner.*

B. G. MILLER, E. J. SAX, H. K. SAALBACH,
*Examiners.*